Dec. 5, 1939.  E. R. MAURER  2,182,404
DRIVING MECHANISM AND CLUTCH THEREFOR
Filed Feb. 26, 1934   2 Sheets-Sheet 1
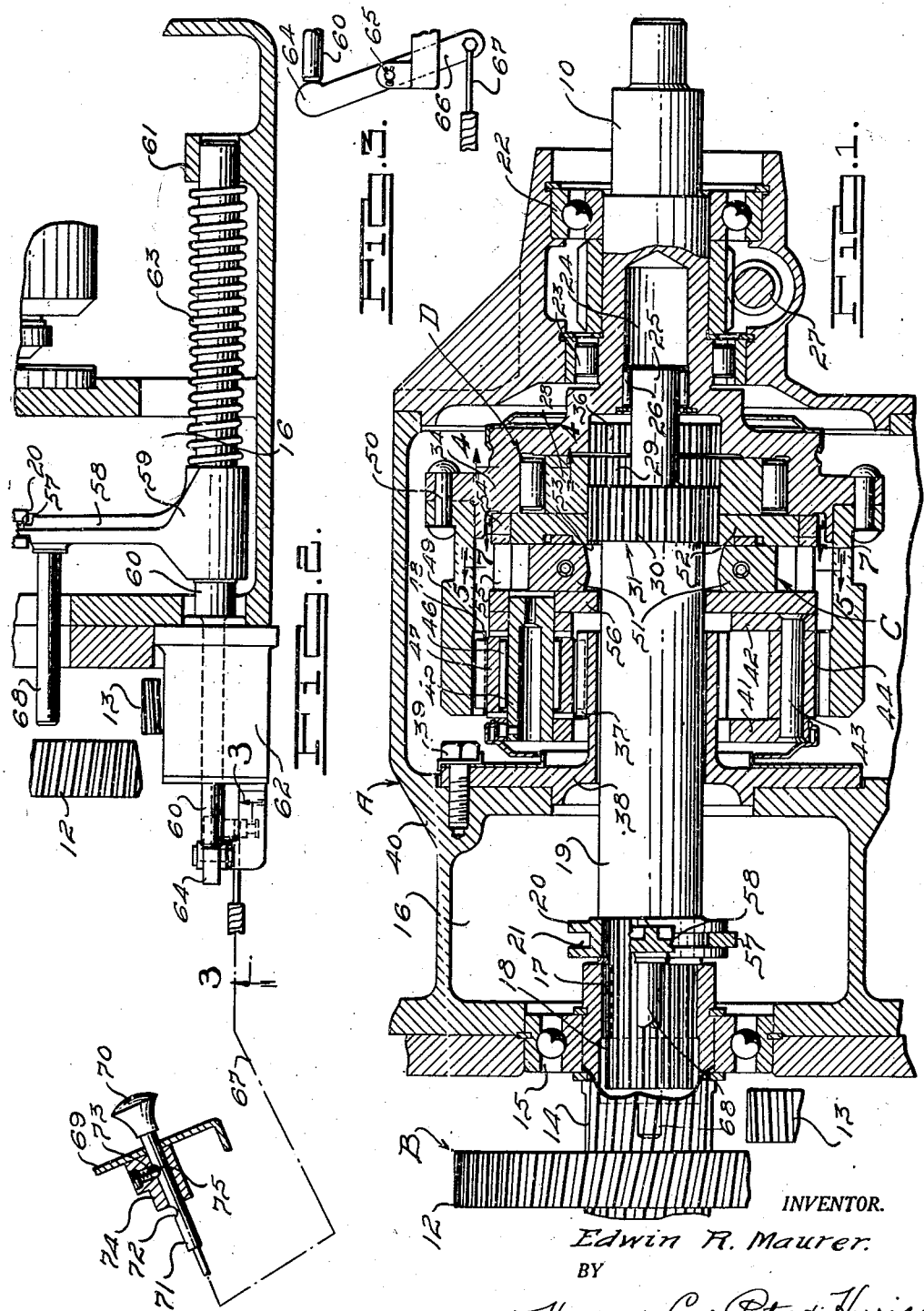
INVENTOR.
Edwin R. Maurer.
BY
Harness, Dind, Pater & Harris
ATTORNEYS.

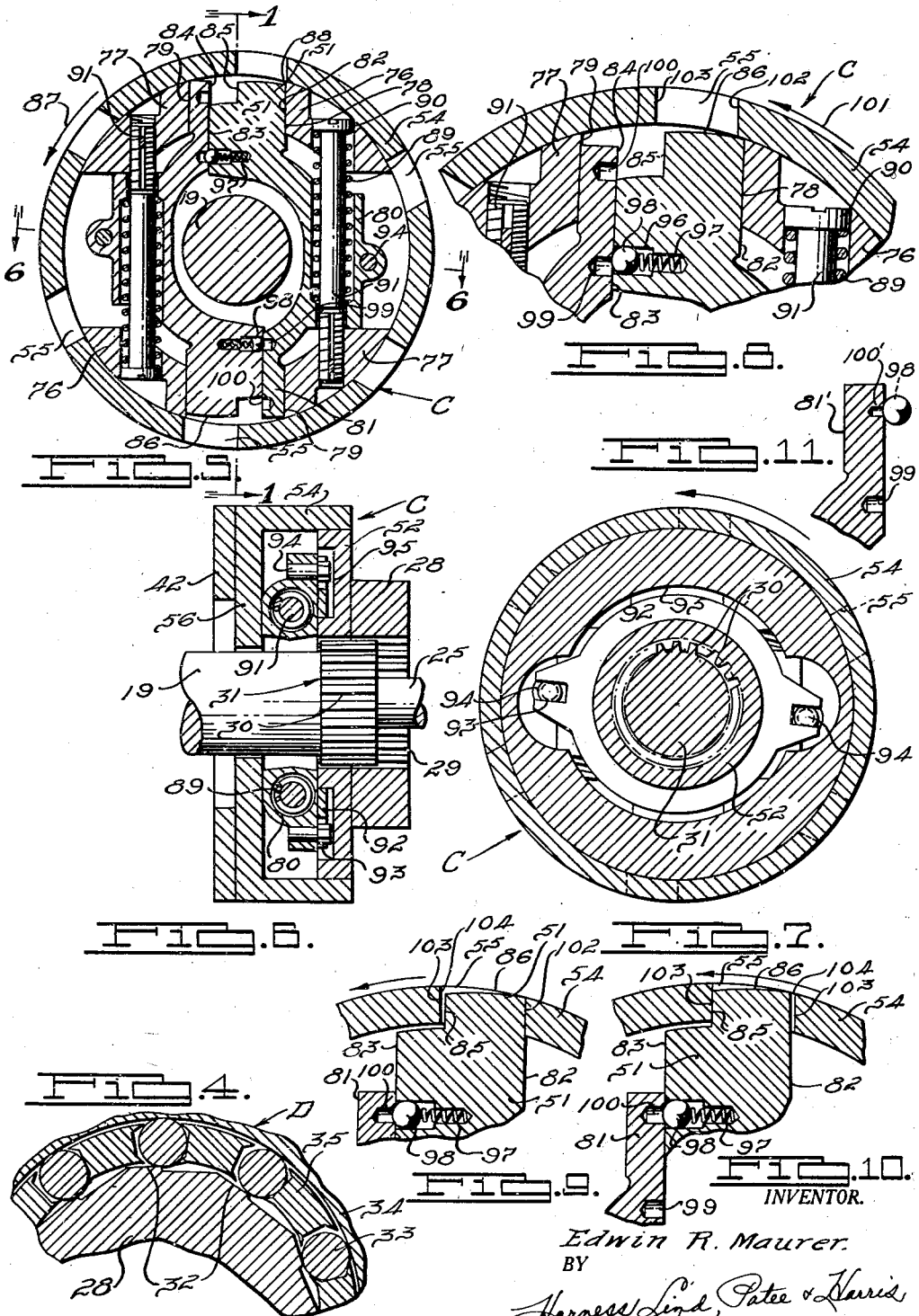

Patented Dec. 5, 1939

2,182,404

UNITED STATES PATENT OFFICE

2,182,404

DRIVING MECHANISM AND CLUTCH THEREFOR

Edwin R. Maurer, Detroit, Mich., assignor to Chrysler Corporation, Detroit, Mich., a corporation of Delaware Application February 26, 1934, Serial No. 712,939

27 Claims. (Cl. 192—105)

This invention relates to driving mechanisms and clutches therefor and refers more particularly to improvements in driving mechanisms for motor cars or vehicles, especially where it is desired to vary the driving speed ratio between the vehicle engine or prime mover and the propelling ground wheels.

It is an object of my invention to provide an improved clutch which will automatically connect parts in a driving mechanism in an improved manner and which will automatically release the connected parts in an improved manner under predetermined desired conditions of relative speeds of such parts.

Another object of my invention resides in the provision of an improved driving mechanism and clutch adapted, under predetermined desired conditions, to automatically effect the drive for the vehicle. My driving mechanism is preferably adapted for use in connection with a speed ratio changing transmission of any desired type, and is adapted in one embodiment thereof to establish an auxiliary driving speed ratio for the vehicle, such as an overdrive ratio, for example. Thus, by way of example, I have provided an overdrive of improved construction and operation which may be automatically effective when the vehicle attains a speed at least as high as a predetermined speed so that, on reaching this critical speed, the overdrive may become effective and on falling below this critical speed the overdrive may become ineffective. I have preferably provided in my mechanism, means for controlling the operation of the overdrive mechanism under varying conditions of speeds of the various parts involved and under various controls manual and otherwise, all of which will be hereinafter more apparent.

A further object of my invention resides in the provision of an improved clutch having one or more pawls, dogs, or clutching members adapted to move into clutching or declutching positions in an improved manner in response to centrifugal forces acting on the pawls. I preferably provide a cage or core adapted to carry a plurality of pawls, and a sleeve or shell provided with suitable slots or openings respectively adapted to receive the pawls for clutching action.

My improved clutch is particularly adapted for motor cars or vehicles, where it is desired to vary the driving speed ratio between the vehicle engine or prime mover and the propelling ground wheels. Thus, my invention may be used to advantage in transmissions and other driving mechanisms for effecting automatic changes in the driving speed ratio, the pawl carrying cage being preferably driven by the engine and the shell by the vehicle ground wheels. Thus, by relatively driving the clutch members by the engine and car, the action of my clutch is responsive to conditions of car speed so as to automatically vary the driving speed ratio under desired conditions. Other uses of my clutch will be apparent from the teachings of my invention.

Heretofore, in automatic clutches employed with overdriving mechanisms of the general type referred to, it has been deemed most advantageous to drive the pawl cage from the vehicle ground wheels and the slot carrying shell from the engine, prior to engagement of the automatic clutch, the pawl cage being then driven through an auxiliary reduction gearing. The reduction gearing, after engagement of the automatic clutch, provides the desired overdrive, or a drive greater than one to one, from the engine through the automatic clutch and auxiliary gearing and thence to the driving ground wheels. However, under certain conditions of drive and with certain types of automatic clutches, the aforesaid arrangement has certain objections. Thus, when the vehicle is arranged so that it will coast or free wheel down a hill at high speed with the engine idling, the pawls, being driven by the ground wheels in the foregoing illustration, are thrown outwardly under action of centrifugal force and produce objectionable noises and wear incident to the pawls striking the edges of the pawl receiving slots as the pawls run past the slots.

While it has heretofore been proposed to reverse the aforesaid arrangement of such clutch parts whereby the pawls were driven from the engine and the slots from the ground wheels through the auxiliary reduction gearing, prior to clutch engagement, such arrangement is open to certain objections. Thus, for example, when the critical speed of clutch drive was reached, the clutch parts could not be synchronized at that critical speed to effect clutch engagement since the slots were driven at a lesser speed than the pawls by reason of the auxiliary reduction gearing. It was thus necessary to speed up the vehicle an amount above the critical speed of clutch engagement corresponding substantially to the gear ratio of the auxiliary reduction gearing to bring the slots up to the critical speed (the pawls being meantime driven above the critical speed), and then by permitting the vehicle to overrun the engine, the pawls could be slowed down to synchronism with the slots to effect the clutch engagement at the aforesaid critical speed.

A further objection of this aforesaid reverse arrangement arises when the slots are moving faster than the pawls, the pawl speed being above the critical speed, objectionable noises and wear being created by the slot edges bumping the coasting sides or edges of the pawls. Such conditions may arise, for example, by the vehicle coasting downhill in free wheel above the critical speed, followed by engine acceleration above the critical speed but below the speed of the slots.

A further object of my invention, according to one aspect thereof, resides in the provision of an improved driving means so constructed and arranged that the aforesaid objections and difficulties heretofore experienced are overcome.

Another object of my invention resides in the provision of an improved overdriving mechanism including an improved clutching means wherein the pawls are preferably driven from the engine and the slots from the vehicle wheels without the attendant objections noted hereinbefore during the ordinary and usual conditions of driving the vehicle.

In carrying out my invention, in one embodiment thereof, I have provided an improved clutch wherein the pawls are provided with stages or progressions of release, preferably in the form of two progressively acting stages. Thus, primary pawl spring means may be arranged to yieldingly oppose the influences of centrifugal force acting to move the pawls outwardly of the pawl cage, and secondary pawl spring means may be arranged to control the action of the primary spring means. With such arrangement the pawls may be driven from the engine and clutch engagement may be effected at the desired critical speed of vehicle travel without requiring the aforesaid overspeeding of the vehicle above the critical speed of the clutch. Furthermore, by reason of my invention, the clutch approaches its engaging condition without objectionable noises or wear on the clutch parts, and clutch engagement is brought about in an improved manner. In addition, the aforesaid objectionable noises under the conditions noted hereinbefore and ordinarily encountered, are eliminated.

Thus, the speed increment between the action of the primary and secondary spring means of my improved clutch is preferably arranged to afford clutch engagement at the relatively lower speed of pawl cage rotation at which the primary spring means releases the pawls. The secondary spring means, which releases the pawls at a relatively higher speed of pawl cage rotation, holds the pawls from advancing at times when the objectionable noises and wear have heretofore been experienced prior to my invention. Thus, when the vehicle is coasting in free wheeling downhill or being otherwise operated so as to rotate the slots faster than the pawls, the pawl speed being above the critical speed at which clutch engagement takes place as determined by the selection and setting of the primary spring means, the secondary yielding means will hold the pawls from moving outwardly at least up to their relatively high speed setting. Thus, under such conditions, the slot coasting edges do not objectionably bump against the coasting sides of the pawls. It is thus possible, by a suitable selection and setting of the primary and secondary spring means, and by reason of the auxiliary overdrive gearing, to guard against the possibility of conditions of vehicle operation arising where the aforesaid objectionable noises and wear occur, at least within normal conditions of vehicle free wheeling speeds.

A still further object of my invention resides in the provision of means yieldingly opposing retraction of the clutch pawls until a predetermined speed of rotation thereof has been reached, the pawls then quickly retracting without hesitation or "hunting" which heretofore has produced objectionable noises and wear on the clutch parts.

This application provides improvements on the subject matter of my copending applications Serial No. 707,091 filed January 1, 1934, and Serial No. 707,092 filed January 1, 1934.

Further objects of my invention reside in the provision of an improved driving mechanism and clutch, and in the novel combination and arrangement of parts thereof more particularly hereinafter described and illustrated in one embodiment in order to illustrate the details and principles of my invention, reference being had to the accompanying drawings in which:

Fig. 1 is a sectional elevational view through my power driving mechanism, the automatic clutch thereof being illustrated in cross section taken substantially along the line 1—1 of Fig. 5.

Fig. 2 is a fragmentary plan view thereof illustrating the controls for locking out the free wheeling clutch, as in reversing the motor vehicle drive.

Fig. 3 is a detail side elevational view partly in cross section, the section being taken along the line 3—3 of Fig. 2.

Fig. 4 is a sectional elevational view through a portion of the overrunning or free wheeling clutch, the section being taken along the line 4—4 of Fig. 1.

Fig. 5 is a sectional elevational view through my automatic clutch illustrated in the disengaged condition, the section being taken along the line 5—5 of Fig. 1.

Fig. 6 is a sectional view through the clutch shown in Fig. 5, the section being taken along the line 6—6 of Fig. 5.

Fig. 7 is a further sectional elevational view of the clutch shown in Fig. 5, the section being taken along the line 7—7 of Fig. 1.

Fig. 8 is an enlarged fragmentary sectional view of the clutch as shown in Fig. 5, one of the pawls thereof being illustrated in its released position but prior to clutch engagement.

Fig. 9 is a detail sectional view corresponding to Fig. 8, one of the clutch pawls being illustrated in its position occurring at the time of clutch engagement.

Fig. 10 is a view corresponding to Fig. 9, the clutch pawl being shown in the engaged position occurring subsequently to clutching action, the pawl being illustrated as driving the slot carrying shell.

Fig. 11 is a fragmentary sectional view illustrating a modified construction of a pawl for the clutch shown in Fig. 5.

In the drawings, I have illustrated my driving mechanism A interposed between a speed ratio changing transmission B and the driven shaft 10, the latter extending rearwardly to drive the rear wheels (not shown) of the motor car or vehicle in the usual well-known manner, it being understood that I have elected to show my invention in association with a motor vehicle drive although my invention in its broader aspects is not necessarily limited thereto. Furthermore, my driving mechanism may be used to advantage at various other points in the line of general power transmission between the vehicle engine and the driven wheels, or between driving and driven means such as shafts of other types of devices.

The transmission B may be of any suitable type such as the conventional selector type operated in the well-known manner through usual selector controls whereby the various adjustments may be made to the transmission in order to provide the speed ratios in the line of drive through the transmission.

Inasmuch as transmission B may for the most part be of general conventional construction and operation, I have shown only a portion of the gearing of this transmission in Figs. 1 and 2 wherein 12 represents the gear adapted to be shifted by the usual reverse selector control (not shown) rearwardly or to the right as viewed in Figs. 1 and 2 for engagement with the usual reverse idler gear 13 in order to effect a reverse drive from the normal direction of drive to the driven shaft 10. Thus, by appropriate actuation of the usual transmission controls, gears 12 and 13 may be engaged so as to reverse the drive, it being understood that other manipulations of the transmission mechanism are adapted to selectively produce other desired speed ratio changes in the normal direction of rotation for driven shaft 10.

The power coming from the usual engine or other prime mover (not shown) which may be located forwardly of transmission B, drives the transmission and the power is taken from this transmission by a power driving means or shaft 14 rotatable in a bearing 15, the shaft having a portion extending rearwardly into the shifting space 16 of the driving mechanism A. This rearwardly extending portion of shaft 14 is provided with a rearwardly opening splined bore 17 adapted to receive the forwardly extending splined end 18 of the shiftable driving shaft 19, shafts 14 and 19 at all times rotating together by reason of the engaging splines 17 and 18. The driving shaft 19 carries a collar 20 having an annular groove 21, this collar being adapted to axially shift the shaft 19 with respect to the shaft 14 as will be more particularly hereinafter apparent.

The driven shaft 10 extends forwardly in bearings 22, 23 and is provided with a forwardly extending bore 24 slidably piloting the rearwardly extending reduced end 25 of shaft 19, a bearing 26 being provided between the bore 24 and the end portion 25. The usual speedometer take-off drive is illustrated at 27.

My driving mechanism A provides, among other things, an auxiliary driving means or mechanism between the driving and driven shafts 14 and 10 respectively, this driving means being preferably of a construction adapted to provide a speed ratio between these shafts of an overdriving character whereby driven shaft 10 may, under certain conditions hereinafter described, be driven from the driving shaft at a speed greater than a direct drive between these shafts, it being understood that the engine and driving shaft 14 will in such instances be relatively slowed down with respect to heir normal speed of actuation for a given speed of vehicle travel. If desired, the mechanism A may be re-arranged to provide an underdrive instead of an overdrive, although I prefer to arrange the gearing for an overdrive of the driven shaft 10.

I preferably incorporate in my driving mechanism as a part of the primary driving means between driving shafts 14 and 19 and driven shaft 10, an overrunning or free wheeling clutch D best shown in Figs. 1 and 4. This clutch may in itself be of any suitable form, the illustration showing a conventional device in which the inner cam member 28 is driven by internal splines 29 engaged by the splines 30 of a clutch gear 31 formed as a part of the driving shaft 19. The inner cam member 28 has cam faces 32 engaged by cylinders 33 so that by the driving rotation of shaft 19, the high sides of cam faces 32 will wedge the cylinders 33 between cam member 28 and the outer cylindrical driven member 34 of the overrunning clutch to establish a direct drive thereto. The usual spacers 35 maintain the cylinders 33 in spaced position, and since the driven free wheeling part 34 is a forward extension of driven shaft 10 as shown in Fig. 1, it will be apparent that whenever the engine or driving shaft 14 slows down, the vehicle and driven shaft 10 may, by reason of the clutch D overrun the driving shaft, other conditions permitting such action as will be presently apparent.

Intermediate the driven part 34 of the free wheeling clutch D and the bearing 26, the driven shaft 10 is provided with an annular series of internal splined teeth or jaws 36 complementary to the splines 30 of the shiftable clutch 31, the splines 36 and 30 being adapted to interengage when the shaft 19 is shifted rearwardly as will be presently apparent.

Referring now to the auxiliary driving gearing, I have illustrated this gearing as a planetary gearing although if desired other forms of gearing may be employed. In the illustrated embodiment and referring particularly to Fig. 1, the planetary gearing comprises a sun gear 37 fixed by a bracket 38 and fasteners 39 to the casing 40 of the overdrive mechanism A, the shaft 19 freely rotating within this sun gear. A planet carrier is provided with axially spaced rings 41, 42 connected at circumferentially spaced intervals by the tie members 43, the planetary carrier rings 41, 42 being maintained in spaced relationship by sleeves 44 respectively carried by the tie members 43. In Fig. 1 I have illustrated one of these tie members 43 and associated sleeve 44.

Spaced circumferentially between the tie members 43 and the planet gear shafts 45 supported by the rings 41, 42 and journaled by a bearing 46 on each of the shafts 45 is a planetary gear pinion 47 meshing with the aforesaid sun gear 37. The planetary gears 47 also mesh with an internal gear 48 carried by a sleeve 49 which projects forwardly from the outer member 34 of the free wheeling clutch D. The sleeve 49 may be formed as a part of the member 34 or may be rigidly connected thereto as by the fasteners 50 illustrated in Fig. 1. The sleeve 49 has its axis concentric with the axis of shaft 19.

My clutch C, preferably of the automatic type, has its centrifugally actuated pawls or dogs 51 carried by a pawl cage 52 which has an annular series of internal teeth or splines 53 illustrated in Fig. 1 as being interengaged by the splines 30 of the shiftable clutch gear 31.

The companion cooperating clutch member of the automatic clutch C is provided by a cylindrical shell or sleeve 54 having an annular series of spaced pawl receiving slots or openings 55, the shell 54 having an inwardly extending forwardly located plate or flange 56 receiving the rearwardly extending ends of the planetary gear shafts 45 whereby the shell 54 is driven by the planetary gears 47.

The aforesaid annular groove 21 of collar 20 is engaged by a yoke 57, a portion of which is shown in Fig. 1, this yoke extending laterally through an arm 58 as seen in Fig. 2. The arm 58 is provided with a hub 59 fixed to a shiftable rod 60 adapted to reciprocate in guides 61 and 62. The rod 60 receives a spring 63 acting against the guide 61 at one end thereof, the spring 63 yieldingly urging the rod 60 forwardly or to the left as viewed in Fig. 2 by reason of the spring acting against the hub 59. The forward end of rod 60 is engaged by the upper end of a lever arm 64 pivotally mounted at 65 and having a downwardly extending lever arm 66 to which is connected an actuating linkage such as a Bowden wire 67.

The arm 58 has a laterally projecting rod 68 extending into the path of movement of the gear 12 when the latter is moved rearwardly for engagement with the reverse idler gear 13 as aforesaid. The arrangement is such that when the gear 12 is shifted into engagement with gear 13 for establishing the reverse drive, rod 68 will be engaged toward the latter part of the movement of gear 12 so as to move the rod 68 together with the rod 60 rearwardly or to the right as viewed in Figs. 1 and 2, thereby shifting the collar 20 together with the shaft 19 and shiftable clutch gear 31 rearwardly to disengage splines 30, 53 and to engage splines 30, 36 to lock out or render the overrunning clutch D ineffective, splines 30, 29 remaining in engagement for both the forward and rearward shifting positions of shaft 19. During the aforesaid rearward shifting movement of rod 60, spring 63 will be compressed so that on release or forward movement of the gear 12, the parts will be restored to the positions thereof illustrated in Fig. 1 provided however that other controls for the shiftable parts are positioned to accommodate such return movement as will be presently apparent.

In addition to the aforesaid manually operated means for shifting the position of clutch 31 in response to a setting of the reverse gearing of transmission B, I have also provided a further manually controlled means for shifting the clutch 31 independently of the movement thereof under the influence of the reverse setting of the transmission. To this end, the aforesaid Bowden wire 67 as diagrammatically illustrated in Fig. 2 extends for convenient manipulation by the vehicle driver, such position being indicated by the usual dash 69 which mounts a handle or knob 70 connected to the other end of the Bowden wire 67. The handle 70 is adapted for movement by the hand of the vehicle driver, this handle being guided from its position illustrated in Fig. 2 to a position in spaced relationship from dash 69, in which extended position the guide portion 71 of the handle registers a notch 72 thereof with spring pressed ball 73 carried by a guide block 74.

The ball 73 and the notches 72 and 75 engageable therewith cooperate to advise the operator of the proper positioning of handle 70 for effecting the desired movement of the shiftable shaft 19 and clutch 31. In Fig. 2 it will be noted that the ball 73 is illustrated in engagement with the notch 75 and in this position spring 63 is acting to move the clutch 31 forwardly or to the position illustrated in Fig. 1. In this position the splines 30 of clutch 31 are in engagement with the splines 29 of the free wheeling cam member 28 and also with the splines 53 of the pawl cage 52.

It will be noted that when handle 70 is pulled outwardly from dash 69, lever arm 64 will move the rod 60 against the tension of spring 63 so as to shift the clutch 31 to disengage splines 53 and 31 and to engage splines 36 and 30, splines 30 and 29 remaining in engagement as aforesaid, this shifting movement of the clutch 31 under actuation of the handle 70 being independent of a similar clutch shifting movement under the influence of reverse gear 12. It will be apparent that when gear 12 is shifted to engage the reverse gear 13, such movement is effective to shift the clutch 31 rearwardly into engagement with splines 36 as aforesaid, rod 60 separating from its otherwise normally engaging position against lever arm 64 as illustrated in Fig. 3. When the clutch 31 is shifted rearwardly by engagement of notch 72 with ball 73, the clutch device will be maintained in the aforesaid shifted position until the handle 70 is restored to the position illustrated in Fig. 2 whereupon spring 63 will act to restore the clutch to its position illustrated in Fig. 1.

Referring now to the details of my clutch C which is preferably of the automatic type, one embodiment thereof being illustrated in Figs. 5 to 8, the pawl cage 52 is provided with diametrically arranged pairs of lateral extensions or pawl guides 76 and 77. Extensions 76 have pawl engaging faces 78 and extensions 77 have similar bearing faces 79. Fitting within shell 54 are a pair of the said pawls 51, each having a face in sliding engagement with a face 78 of extension 76 and each extending generally inwardly of the pawl carrying cage. Thus, each pawl is formed with a yoke portion 80 normally seated on an extension 77, each yoke portion having a guide counterbalancing portion 81 slidable intermediate a face 79 and the sides of the other pawl opposite the sides thereof in engagement with the face 78.

The face or side of each pawl 51 which slides against a face 78 has been designated by reference character 82 and this side of the pawl may be referred to as the coast side. The opposite side or face of each pawl 51 is indicated at 83 in sliding contact with the face 84 of the guide portion 81 of the other associated pawl. The drive side or face of each pawl 51 is indicated at 85 and it will be noted that this side 85 is offset from the side 83. Each pawl 51 has an outer cam face 86, it being noted that the drive side is spaced somewhat farther from the inner surface of shell 54 than the spacing of the outer extremity of the coast side 82, when the clutch C is disengaged as shown in Fig. 5, so that the cam face 86 may be said to extend forwardly and radially inwardly of the direction of rotation of the clutch as indicated by the arrow 87 in Fig. 5. It will be noted that with the pawls 51 positioned as illustrated in Fig. 5, the cam face 86 at its highest point at the outer extremity of the coast side 82, has a clearance 88 with the inner surface of the slot carrying shell 54.

In order to normally urge the pawls 51 inwardly of the pawl cage 52 to position the parts as shown in Fig. 5, primary yielding means such as springs 89 are provided, each spring acting on the head 90 of a screw bolt 91 threadedly engaging suitable openings in extensions 77, the yoke portions 80 being also provided with suitable openings so as to slidably receive the respective bolts 91 and springs 89 cooperating therewith. Thus, the heads 90 of bolts 91 provide abutments for the springs 89, these springs respectively acting at their operating ends on the yoke portions 80 of the pawls.

In order to synchronize and equalize the movement of the pawls 51 when these pawls move outwardly or inwardly, the pawls may be tied together by an equalizer ring 92 having diametrically opposite slotted portions 93 thereof receiving pins 94 respectively carried by the yoke portions 80 of the pawls. This equalizer ring 92 thus oscillates within the space 95 formed in the pawl cage 52 as will be noted from Fig. 6.

The shell 54 has the aforesaid plurality of circumferentially spaced pawl receiving slots or openings 55 suitably spaced so that diametrically arranged pairs of slots will simultaneously register with the pawls 51 so as to receive said pawls under conditions hereinafter more apparent.

The threaded ends of screw bolts 91 permit adjustment of the springs 89 when the heads 90 of these bolts are registered with one of the slots 55 of shell 54, it being understood that the sleeve 49 and casing 40 may have one or more aligned openings adapted for alingment with one of the slots 55 at the time of registration therewith of a bolt head 90 whereby adjustment of the primary springs 89 may be effected from without the overdrive casing, the aligned openings in the aforesaid sleeve and casing not being illustrated in my drawings.

When pawls 51 move outwardly into slots 55, such movement is limited by engagement of yoke portions 80 with projections 76, the yoke portions sliding on bolts 91.

Each pawl 51 is formed with a pocket 96 opening toward a space 84 of the associated counterbalancing guide portion 81 of the other pawl, each pocket 96 receiving secondary yielding means which may be in the form of a spring 97. Each spring 97 acts on a ball 98 movably housed within opening 96 adjacent the other end thereof. Each space 84 is provided with an inner ball receiving detent 99 according to one important feature of my invention and, according to a further feature of my invention, the face 84 is preferably provided with an outer ball receiving detent 100. Where it is desired to provide the outer detent 100 as well as the inner detent 99, these cooperating pairs of detents are spaced apart a distance equal to twice the radial or outward movement of each pawl 51, it being noted that when the pawls move outwardly together, the pawl 51 and associated guide 81 of the other pawl move in opposite directions and to the same extent. The purpose of the detents 99 and 100 will be more apparent hereinafter.

In the operation of my improved driving mechanism and clutch, according to the aforesaid illustrated embodiment thereof, let it be assumed that the parts are positioned as indicated in Figs. 1 to 7 inclusive. This position of parts is the normal driving condition of the vehicle wherein the overdrive may take place. Thus, the drive coming from the engine and thence through transmission B passes from transmission driving shaft 14 to the driving shaft 19, the drive then being transmitted through clutch 31 to the free wheeling cam 28, through the free wheeling clutch D and thence to the outer free wheeling member 34 and driven shaft 10 to the vehicle driving ground wheels. Under such conditions the motor vehicle will be directly driven between driving and driven shafts 14 and 10 respectively, the driven shaft 10 overrunning the driving shaft 14 whenever the engine and driven shaft are slowed down below the speed which is required to establish a drive to the motor vehicle.

By reason of an appropriate selection and setting of the primary springs 89 and also by an appropriate selection of spring characteristics for the secondary springs 97, the operation of the automatic clutch C may be varied as desired within wide limits of engagement and disengagement of clutch C and it is not my intention to limit my invention to any particular speed responsive characteristics of my clutch. In order to more clearly explain a typical operation of the automatic clutch, and by way of example, let it be assumed that it is desired to establish engagement of clutch C when the motor vehicle is driven at approximately 40 miles per hour. Let it further be assumed that when the motor vehicle is traveling at a speed of 40 miles per hour in direct drive from shaft 14 to shaft 10 through the free wheeling clutch D, that shafts 14 and 19 and also driven shaft 10 will run at 2000 R. P. M., the usual reduction gearing at the motor vehicle rear axle (not shown) accommodating these illustrative assumed conditions. The motor vehicle speed of 40 miles per hour and the corresponding 2000 R. P. M. of the driven shaft, may, for convenience, be termed the primary critical speed of engagement of the automatic clutch C.

In the foregoing assumed illustration, the selection and setting of the primary springs 89 will be presumed to be such that when the pawl carrying cage 52 is driven at approximately 1400 R. P. M., the pawls 51 will tend to move outwardly under the action of the centrifugal force which, in the general range of this primary critical speed, is sufficient to overcome the resistance provided by springs 89 which tend to hold the pawls in their retracted position. As will be presently apparent, the pawls 51 will tend to overcome the resistance of springs 89 in the vicinity of 1400 R. P. M. of rotation of the pawl cage 52, it being understood that a few revolutions per minute greater or less than the assumed 1400 will ordinarily be required to actually effect the outward movement of the pawls. In this connection, the rate of springs 89 together with the amount of counterbalance provided by the yoke portions 80 and the counterbalancing guide portions 81 is preferably such that as the pawls move outwardly the springs 89 will increase in resistance substantially the same as the increase in centrifugal force whereby the pawls may be said to float in any position during their outward movement, such arrangement not in itself, however, forming a part of my invention according to this application.

Pursuing further the aforesaid specific example, let it be further assumed that the secondary springs 97 or other releasable latching means are of such force that pawls 98 will be held in their respectively associated detents 99 until the pawl cage 52 is rotated above the aforesaid primary critical speed, and by way of further illustration, let it be assumed that the inner detents 99 will hold the pawls 51 against outward movement until the pawl cage is operated at approximately 2000 R. P. M. so that at this secondary critical speed the centrifugal force acting on the pawls is sufficient to release the pawls 98 from their associated detents 99.

Let it be further assumed in the aforegoing illustration of values, that the auxiliary planetary gearing provides a gear train of such value that when the automatic clutch C is not engaged, the slot carrying shell 54 will be driven from driven shaft 10 at a speed less than that of driving shaft 19 and pawl cage 52, the amount of this reduction being determined by the amount of overdrive desired as will be presently understood. Let it be presumed that the amount of this reduction in terms of R. P. M. of the driving shafts 14 and 19 is 70%, it being thus apparent that when the vehicle is being driven with the parts in the aforesaid position of Fig. 1 the shell 54 will rotate at 980 R. P. M. when the pawl cage 52 is rotating at its primary critical speed of 1400 R. P. M. It will furthermore be apparent that when the pawl cage is rotated at the secondary critical speed of 2000 R. P. M., the shell will be rotated at the primary critical speed of 1400 R. P. M.

With the foregoing illustrative values in mind, let it be presumed that the vehicle is accelerated with the parts positioned as in Fig. 1 to a vehicle speed of about 28 miles per hour corresponding to the primary critical speed of 1400 R. P. M. of shafts 19 and 10 in direct drive, and 980 R. P. M. of the shell 54 driven from shaft 10. At approximately this speed the primary springs 89 have their resistance to pawl movement overcome by the centrifugal force acting on the pawls, but the secondary springs 97 will hold the pawls against outward movement. Thus, at the primary critical speed on acceleration with the secondary springs 97 acting to hold the balls 98 in engagement with the inner detents 99, the clearance 88 between the pawls and shell 54 will be maintained.

Let it now be presumed that the motor vehicle is further accelerated under power from the engine so as to rotate the driving shafts 14 and 19 at the secondary critical speed of 2000 R. P. M. Under such conditions, it will be apparent that the driven shaft 10 is also operating at 2000 R. P. M. and the motor vehicle is being driven at 40 miles per hour. With the pawl cage 52 also driven at 2000 R. P. M., the inner detents 99 are released by the centrifugal force acting on the pawls and such force will then move the pawls outwardly to take up the clearance 88 and slightly space the balls 98 outwardly from detents 99 to a position as indicated in Fig. 8. At 2000 R. P. M. of the driving and driven shafts, the shell 54 will be rotating at the primary critical speed of 1400 R. P. M. and in the same direction of rotation as that of the pawl cage and in accordance with the arrow 101 in Fig. 8. Thus, the shell will be rotating considerably slower than the pawls and engagement of the pawls in the slots 55 will be prevented by reason of the fact that the pawls do not have time to move outwardly to engage the slots as they rapidly rotate past the successive slots. Furthermore, the cam faces 86 of the respective pawls are so arranged as illustrated in Fig. 8 that the high sides of these cam faces hold the pawls adjacent the coast sides 102 of the slots, the leading edge of the cam faces 86 being thereby spaced inwardly from shell 54 a sufficient amount so that as the pawls move across the slots this leading edge of the cam faces will be in advance of the driving sides 103 of the slots 55 by the time the pawls strike the shell 54 on jumping the slots. The cam face 86 is such that during this movement of the pawls within shell 54, the pawls are smoothly rotated without objectionable noise or wear and the pawls will continue to pass the slots 55 without engagement therewith until the rotational speeds of the shell and pawl cage are substantially synchronized as follows.

After the vehicle is driven at the aforesaid speed of 40 miles per hour or at a greater speed, let it be presumed that the operator of the motor vehicle desires to effect engagement of the automatic clutch C so as to drive the motor vehicle with the overdrive in operation. The driver will then diminish or release the power from the engine by withdrawing his foot from the usual accelerator pedal and the speed of the engine will thus rapidly decelerate although, by reason of the overrunning clutch D, the motor vehicle will continue to travel at the aforesaid assumed illustrative speed of 40 miles per hour, it being presumed for the moment that the motor vehicle is traveling on a level roadway without decelerating or retarding influences. As the engine decelerates, the pawls 51 will likewise decelerate from the aforesaid 2000 R. P. M. at 40 miles per hour of vehicle travel, the pawls smoothly passing within the shell and beyond the successive slots 55 until the engine has decelerated to substantially the primary critical speed of the shell 54 which continues at 1400 R. P. M.

As the engine decelerates, the side 103 of each slot 55 engages each cam face 86 as the pawls pass the slots, the successive engagement progressing forwardly along cam face 86 toward the driving side 85 of the pawls as the engine progressively decelerates. Finally, the shell 54 and cage 52 are substantially synchronized, the pawls 51 being urged outwardly under centrifugal force and the engine continuing to decelerate until the R. P. M. of the pawl cage is just less than that of the shell 54 so that the shell now begins to very slowly rotate relatively faster than the pawls. When this condition occurs it will be apparent that each pawl 51 while engaging shell 54 will be approached very slowly by a coasting side 102 of a slot 55 which will be adjacent such pawl so that as the cam face 86 of each pawl guides the pawl outwardly in a slot 55, the coast side 82 of such pawl will project into such slot and will be contacted with a coast side 102 of shell 54. When engagement of sides 102 and 82 takes place further difference of rotational speeds between the shell and pawl cage is prevented and the centrifugal force is still sufficient to act at such time on the pawls to move them outwardly in a pair of the slots 55 and the automatic clutch C is thereby smoothly engaged with the parts positioned as indicated in Fig. 9. The distance between the engaging portions of the pawls between sides 82 and 85 is preferably slightly less than the distance between sides 102 and 103 of slots 55, the clearance thereby provided being indicated at 104 in Fig. 9, it being remembered that the Fig. 9 position of the parts occurs as engagement of the coast sides 102 and 82 takes place, the motor vehicle now driving the shaft 19 and the engine through the planetary gearing, the free wheeling clutch D permitting overrunning between the vehicle and engine. Also, when the parts assume the positions illustrated in Fig. 9, and according to a further feature of my invention, the balls 98 are preferably arranged so that their associated springs 97 cause these balls to engage the outer detents 100 respectively.

With the automatic clutch C engaged according to Fig. 9, the driver of the motor vehicle may now open the engine throttle as by depressing the usual accelerator pedal, the driving shafts 14 and 19 being thereby accelerated under power and the driving sides 85 of the pawls immediately moving over into driving contact with the driving sides 103 of the engaged slots 55 according to Fig. 10. Thus, the clearance 104 is now located between the associated coast sides 102 and 82. The motor vehicle is now in the overdriving condition, the driven shaft 10 being driven through the auxiliary planetary gearing and the clutch D providing the necessary overrunning between the outer and inner clutch parts by reason of the difference in speeds of these parts. Thus, the drive passes from driving shafts 14 and 19 through clutch 31, pawl cage 52 to the pawls 51 and thence according to Fig. 10 to the shell 54. From the shell 54 the drive passes to the planetary gears 57, these gears serving to rotate the sleeve 49 and driven shaft 10 at a speed greater than that of driving shafts 14 and 19 by the amount of overdrive ratio afforded by the auxiliary gearing. The automatic clutch C will remain in engagement as the vehicle is accelerated above the aforesaid 40 miles per hour at which the clutch engagement was presumed to have occurred, and the disengagement or release of the overdrive and automatic clutch is effected as follows.

Let it be presumed that the motor vehicle is decelerated from a condition of overdriving so that the motor vehicle is driven below 40 miles per hour. In the assumed illustration, the primary springs 89 will tend to urge the pawls 51 inwardly when the pawl cage is rotated below the primary critical speed of approximately 1400 R. P. M. which was presumed to occur at 40 miles per hour of vehicle travel at the time of engagement of the automatic clutch C. Heretofore, when the motor vehicle was decelerating with the vehicle driving the engine, and when the speed of the pawl cage was such that the springs associated therewith would tend to retract the pawls, then just before the pawls were released from the pawl cage, the pawls would tend to creep inwardly until they reached a condition during deceleration where the centrifugal force was great enough to barely keep the pawls in the slots but the slots would tend to force the pawls inwardly at their coasting sides, the resulting spring effort built up by such inward movement forcing the pawls outwardly and causing them to bump and produce objectionable noises and wear by engagement of the driving sides of the pawls with the next slots. This effect which may be termed a "hunting" action was experienced heretofore in an objectionable manner on the coasting action of the vehicle during release of the automatic clutch, and I have overcome such objections by the provision of the releasable latch herein shown in the form of the outer detent 100 in association with each of the pawls 51. Thus, with the clutch engaged and where the vehicle is decelerating so that the vehicle drives the engine according to Fig. 9, when the pawl cage 52 is rotated at the aforesaid primary critical speed of 1400 R. P. M. or just sufficiently therebelow so that the primary springs 89 tend to urge the pawls inwardly, a dwell in the inward movement of the pawls is afforded by reason of the outer detents. This dwell for release of the automatic clutch may be made to any extent desired by suitably proportioning the size of the outer detents 100 so that when the speed of the pawl cage is finally sufficiently reduced to cause the primary yielding to exert sufficient force under conditions of lessening centrifugal force to overcome the friction and centrifugal force resistance to inward pawl movement by engagement of balls 98 with the respective outer detents 100, the outer detents suddenly release the pawls and they move inwardly immediately without any hesitation or objectionable "hunting" action aforesaid.

In Figs. 5 and 8 to 10, I have illustrated the outer detents 100 as being substantially the same size as the inner detents 99 and under such circumstances the dwell provided by the outer detents for pawl release below the primary critical speed will be substantially more on coasting deceleration of the motor vehicle than where these outer detents are made smaller in diameter than the inner detents. Thus, in Fig. 11 I have illustrated a modified form of one of the counterbalancing pawl guide portions 81' wherein the outer detent 100' is smaller than the inner detent 99, it being understood that the counterbalancing guide portions 81 of the automatic clutch C of Fig. 5 may, if desired, have each of its pawls constructed in the manner suggested in Fig. 11. In the Fig. 11 embodiment, the dwell afforded by outer detents 100' prior to retraction of the pawls, while still adequate to prevent the aforesaid "hunting" action, will release the pawls at a higher point in the decelerating speed of the motor vehicle than in the case of the Fig. 5 embodiment.

Thus, by way of further illustration, on decelerating with the parts positioned as in Fig. 9 and with the motor vehicle coasting and driving the engine through the auxiliary planetary gearing, the pawls will be retracted at some vehicle speed less than the aforesaid critical speed and this may be in the neighborhood of 20 miles per hour or 700 R. P. M. of the pawl cage. During such coasting action on deceleration, the retraction of the pawls is also slightly delayed somewhat below the speed where springs 89 would otherwise act by reason of the friction of drive established at the coast sides of the slots as at 102 acting against the coast sides 82 of the pawls in driving the engine. This friction is largely static, holding the pawls against initial retracting movement. Ordinarily, the pawls will be quickly released somewhat earlier on the coasting deceleration than the aforesaid 20 miles per hour of vehicle travel in the event that the acceleration is depressed so that the engine is made to drive the vehicle whereby the aforesaid friction at the coast sides of the slots and pawls is relieved, the parts then assuming the Fig. 10 condition. During this transition of clearance 104, the friction is momentarily relieved from the sides of the pawls and the pawls may then retract provided, of course, that the speed of the pawl cage is below the speed at which the outer detents 100 will release the pawls. If the condition of Fig. 10 is assumed prior to clutch release, the friction of drive takes place at the driving sides of the engaged portions of the slot and pawls but in any event the pawls will automatically retract at a sufficiently low speed of the pawl cage determined by the proportioning of the primary and secondary springs and the outer detents 100.

Thus, in the Fig. 11 embodiment of my invention the pawls will automatically retract when the pawl cage is rotated below the aforesaid critical speed but at a speed greater than that for pawl retraction for the Fig. 5 embodiment.

It will be noted that by reason of my invention, I have prevented the possibility, under usual driving conditions, of objectionable noises and wear taking place when the automatic clutch is not engaged and were the motor vehicle might be coasting down a hill at a speed considerably greater than the primary critical speed of 40 miles per hour, and where the engine might be accelerated to a speed to drive the pawl cage less than the speed of the slot carrying shell but in excess of the primary critical speed for automatic clutching action. Thus, the inner detents 99 will still maintain the pawls in retracted condition to prevent such condition arising. Thus, the objectionable bumping at the coast sides of the slots and pawls may arise whenever the slots are turning faster than the pawls, the pawls rotating at such speed that their retracting springs are overcome by centrifugal force and they are trying to engage.

Heretofore, where an automatic clutch of the general type illustrated has been provided, and where for example the automatic clutching action is desired to take place at approximately 40 miles per hour of motor vehicle travel, in coasting downgrade with the motor vehicle running at a speed greater than 40 miles per hour, for example, and the engine being accelerated just above the critical speed for clutch engagement, the pawls in such instance being driven at a speed slightly less than that of the slot carrying shell, it will be apparent that the pawls would be endeavoring to engage the slots by reason of the centrifugal force having overcome the action of the retracting springs associated therewith and the objectionable noises and wear would occur through successive contact of the coast sides of the slot carrying shell with the coast sides of the pawls until clutch engagement is effected.

By reason of my invention this bumping action of the coast sides of the slots and pawls will not occur within the ordinary ranges of vehicle driving since it will be apparent that for such condition to arise, it would first be necessary to free wheel the motor vehicle downgrade at an excessively high speed beyond the range of customary motor vehicle driving in order to make the slots drive faster than the pawls which also must be released so that they are trying to engage the slots. For example, to encounter such conditions with my driving mechanism, and again using the foregoing assumed values for convenience, the motor vehicle would have to be free wheeled at a speed above 57 miles per hour which would correspond to a speed of 2000 R. P. M. for the shell 54 which is the minimum R. P. M. at which the inner detents will break away to release the pawls in the illustration. The increment of 600 R. P. M. in the illustrated values between the primary and secondary critical speeds thus removes the difficulties of experiencing the aforesaid bumping and wear. At the same time the pawls engage at the primary critical speed. Obviously, if desired, the secondary springs 97 may be heavier or of greater pressure or the inner detents 99 may be enlarged so as to prevent release of the pawls at an R. P. M. of the pawl cage in excess of the assumed 2000 R. P. M. and in such instance the speed at which the aforesaid bumping of the coast sides of the slots and pawls will be correspondingly raised. It is believed, however, that rarely if at all will a motor vehicle be permitted to accelerate in free wheeling condition down a grade, for example, at a speed greater than the aforesaid assumed 57 miles per hour and even then the bumping action of the slots and pawls will not occur unless the engine were accelerated to just below synchronism of the pawl cage and slot carrying shell.

In the foregoing description of the operation of my driving mechanism, it has been presumed that the parts were positioned as shown in Fig. 1, reference being made particularly to the position of shifting clutch 31 which has been presumed to have remained in driving engagement with the pawl cage 52 and the free wheeling cam 28. When the motor vehicle is driven in reverse, the shifting clutch 31 is moved as aforesaid so as to connect shaft 19 not only with the free wheeling cam 28 but also directly to the driven shaft 10 by reason of engagement of splines 30 and 36. Thus, the free wheeling clutch D is rendered ineffective and, incidentally, the pawl cage 52 is released from driving connection with shaft 19. The latter is of particular significance when, instead of clutch 31 being shifted by the transmission reversing mechanism, the motor vehicle driver desires to render the automatic clutch ineffective, he pulls the handle 70 so as to engage notch 72 with ball detent 73, such action shifting clutch 31 independently of the transmission reversing mechanism so as to drivingly engage splines 30 with splines 29 and 36. Under such conditions the automatic clutch C is rendered ineffective inasmuch as the pawl cage 52 is no longer drivingly connected with driving shafts 14 and 19, and the motor vehicle is then driven in direct drive from driving shafts 14 and 19 to driven shaft 10, the overrunning clutch D being also thereby rendered ineffective for free wheeling purposes. When the handle 70 is restored to the position indicated in Fig. 2, the spring 63 will act to again move the shifting clutch 31 forwardly to the position illustrated in Fig. 1.

If desired, a further notch may be provided in the handle stem 71 intermediate the notches 72 and 75 so as to position the shifting clutch 31 for engagement of splines 30 with splines 29 only, whereby the motor vehicle can be driven directly from driving shaft 19 to driven shaft 10 through the free wheeling clutch D and overrunning action of driven shaft 10 may occur with respect to driving shaft 19 although I have not illustrated such further positioning of the shifting clutch 31.

While I have referred by way of example to primary and secondary critical speeds of 1400 R. P. M. and 2000 R. P. M. respectively, I desire to point out that the critical speeds will not ordinarily be established at an exact R. P. M. since factors of friction, spring design limitation, etc. will in most instances establish the critical speeds as an approximation of the desired values. However, for a given mechanism, the action of the automatic clutch will be duplicated under similar conditions of motor vehicle drive and it is relatively unimportant in most instances whether the automatic clutch engages at precisely 40 miles per hour of vehicle travel and releases at precisely 20 or 30 miles per hour or at such other speeds as may be desired. The adjustment for the primary springs will ordinarily provide the variation in clutch performance which may be desired and for extreme variations, different springs giving the desired performance may be substituted as will be readily understood.

With my driving mechanism, it is possible to accelerate the motor vehicle to its top speed, if desired, with clutch 31 positioned as in Fig. 1, and without driving the vehicle through the auxiliary overdriving mechanism. However, under such conditions, whenever the vehicle is allowed to free wheel so as to momentarily slow down the pawls to the speed of the slots, the automatic clutch will engage inasmuch as the speed of the pawl cage will then be in excess of the secondary critical speed of 2000 R. P. M.

Once the automatic clutch is engaged at the primary critical speed of 40 miles per hour of vehicle travel for example, it is ordinarily desirable to maintain the overdrive in engagement for a reasonable speed range in the neighborhood of 40 miles per hour. Thus, with my mechanism, the primary yielding means acting in conjunction with the inner and outer pawl detents will assure clutch engagement once a desired vehicle speed has been attained followed by a vehicle overrunning action, the engine decelerating as usual very rapidly so that the vehicle speed does not appreciably diminish before clutch engagement; and on vehicle coasting deceleration the clutch will preferably be disengaged sufficiently below the engaging speed so that it will not objectionably release for momentary slowing of the vehicle within a few miles per hour below the clutch engaging speed. If it is desired to fix the clutch engagement and disengagement within a very narrow range of speed difference, such conditions may be readily brought about by variation in the releasable pawl latch as suggested by the smaller detents 100' of Fig. 11 in my illustrated embodiment.

I desire to again point out that all references to specific values of motor vehicle driving speeds, speeds in R. P. M. of the various parts of the driving mechanism, and other specific references in the conditions of particular operation of the mechanism have been set forth herein by way of example only and not by way of limitation of my invention since it will be readily apparent that the various parts may be made to operate within wide ranges of speeds and under widely varying conditions as may be desired under any circumstances or conditions of application and operation of my driving mechanism.

While I have illustrated my invention in connection with an overdrive mechanism for motor vehicles, I desire to point out that this is but one useful application or use of my driving mechanism and clutch. My improvements may be used to advantage wherever clutching action between two rotatable parts is desired, particularly where such action is to be automatically responsive to desired conditions of relative rotatable speeds of the two members to be clutched or declutched.

I furthermore do not limit my invention, in the broader aspects thereof, to any particular combination and arrangement of parts such as shown and described for illustrative purposes since various modifications will be apparent from the teachings of my invention and scope thereof as defined in the appended claims.

What I claim is:

1. In a clutch for drivingly connecting driving and driven members, a pawl carrying structure adapted for driving connection to one of said members, a pawl receiving structure adapted for driving connection to the other of said members, a pawl carried by said pawl carrying structure and adapted for movement in response to centrifugal force acting thereon for clutching engagement with said pawl receiving structure to provide a positive driving connection between said members, means acting to yieldingly urge said pawl toward a disengaged position, and releasable means acting on said pawl to restrain clutching movement thereof at a rotational speed of said pawl carrying structure otherwise sufficient to cause clutching movement of said pawl, said restraining means being released in response to centrifugal force acting on said pawl whereby said pawl moves only partially toward its clutching position, said pawl being adapted for movement to its clutching position in response to change in rotational speed of said pawl carrying structure.

2. In a clutch for drivingly connecting driving and driven members, a pawl carrying structure adapted for driving connection to one of said members, a pawl receiving structure adapted for driving connection to the other of said members, a pawl carried by said pawl carrying structure and adapted for movement in response to centrifugal force acting thereon for clutching engagement with said pawl receiving structure to provide a positive driving connection between said members, means acting to yieldingly urge said pawl toward a disengaged position, and releasable means acting on said pawl to restrain clutching movement thereof at a rotational speed of said pawl carrying structure otherwise sufficient to cause clutching movement of said pawl, said restraining means being released in response to centrifugal force acting on said pawl, said pawl when released by said restraining means being moved by centrifugal force only partially toward its clutching position.

3. In a clutch for drivingly connecting driving and driven members, a pawl carrying structure adapted for driving connection to one of said members, a pawl receiving structure adapted for driving connection to the other of said members, a pawl carried by said pawl carrying structure and adapted for movement in response to centrifugal force acting thereon for clutching engagement with said pawl receiving structure, means acting to yieldingly urge said pawl toward a disengaged position, and releasable means acting on said pawl to restrain clutching movement thereof at a rotational speed of said pawl carrying structure otherwise sufficient to cause clutching movement of said pawl, said restraining means being released in response to centrifugal force acting on said pawl, said structures having relatively different rotational speeds at the time of said release of said restraining means, said pawl being adapted for clutching engagement with said pawl receiving structure limited to substantially uniform rotational speeds of said structures.

4. In a clutch for drivingly connecting driving and driven members, a pawl carrying structure adapted for driving connection to one of said members, a pawl receiving structure adapted for driving connection to the other of said members, a pawl carried by said pawl carrying structure and adapted for movement in response to centrifugal force acting thereon for clutching engagement with said pawl receiving structure, means acting to yieldingly urge said pawl toward a disengaged position, and releasable means acting on said pawl to restrain clutching movement thereof at a rotational speed of said pawl carrying structure otherwise sufficient to cause clutching movement of said pawl, said restraining means being released in response to centrifugal force acting on said pawl, said structures having relatively different rotational speeds at the time of said release of said restraining means, said pawls being adapted for clutching engagement with said pawl receiving structure limited to substantially uniform rotational speeds of said structures, said restraining means being rendered substantially ineffective to restrain pawl clutching movement subsequent to said release thereof and during rotation of said pawl carrying structure substantially at or above the rotational speed of said pawl carrying structure sufficient to urge said pawl toward its engaging position in opposition to said yielding means.

5. In a centrifugally operated clutch, a rotatable clutching member having a pawl movably responsive to centrifugal force for clutching action, a rotatable clutching member adapted for clutching engagement with said pawl when the rotation of said members is substantially synchronized, yielding means opposing pawl clutching movement at less than a primary speed of rotation of said pawl, and releasable means adapted until released to restrain pawl clutching movement during rotation thereof at a speed substantially greater than said primary speed, said restraining means releasing said pawl at a predetermined secondary speed of rotation of said pawl, said pawl being adapted for clutch engaging movement subsequent to release of said restraining means and on rotational retardation of said pawl to a rotational speed thereof substantially equal to or greater than said primary speed.

6. In a centrifugally operated clutch, a rotatable clutching member having a pawl movably responsive to centrifugal force for clutching action, a rotatable clutching member adapted for clutching engagement with said pawl when the rotation of said members is substantially synchronized, yielding means opposing pawl clutching movement at less than a primary speed of rotation of said pawl, and releasable means adapted until released to restrain pawl clutching movement during rotation thereof at a speed substantially greater than said primary speed, said restraining means releasing said pawl at a predetermined secondary speed of rotation of said pawl, said pawl being adapted for clutch engaging movement subsequent to release of said restrainng means and on rotational retardation of said pawl to a rotational speed thereof substantially equal to or greater than said primary speed, the rotational speed of said second clutching member substantially at the time of said release of said restraining means being substantially the same as said primary speed.

7. In a clutch for drivingly connecting driving and driven members, a pawl carrying structure adapted for connection to one of said members, a pawl receiving structure adapted for connection to the other of said members, a pair of pawls carried by the pawl carrying structure and adapted for movement in response to rotation of the pawl carrying structure, means carried by said pawl receiving structure for receiving said pawls to connect said structures, yielding means urging said pawls to their disengaged position, one of said pawls having a guide portion slidably engaging the other of said pawls, and latch means intermediate said pawl guide portion and said pawl engaged therewith, said latch means releasably holding said pawls in their respective positions of engagement with and disengagement from said pawl receiving structure.

8. In a clutch for drivingly connecting driving and driven members, a pawl carrying structure adapted for connection to one of said members, a pawl receiving structure adapted for connection to the other of said members, a pair of pawls carried by the pawl carrying structure and adapted for movement in response to rotation of the pawl carrying structure, means carried by said pawl receiving structure for receiving said pawls to connect said structures, yielding means urging said pawls to their disengaged position, one of said pawls having a guide portion slidably engaging the other of said pawls, said guide portion having a pair of detents, and means carried by the last said pawl adapted to yieldingly engage said detents respectively when said pawls are engaged and disengaged.

9. In a clutch for drivingly connecting driving and driven shafts, clutch means controlling said drive, said clutch means including a pawl carrying structure adapted to be driven from said driving shaft, a pawl carried by said pawl carrying structure, a slot carrying clutch structure having a slot adapted for engagement by said pawl for engaging said clutch means, said slot carrying clutch structure being driven from said driven shaft at a speed less than that of said pawl carrying clutch structure when said clutch means is disengaged, yielding means acting to hold said pawl against movement into said slot under the influence of centrifugal force acting on the pawl during rotation thereof at speeds of rotation of said pawl carrying clutch structure less than a predetermined primary critical speed of rotation of the pawl carrying clutch structure, said yielding means being adapted to release said pawl for clutching action at speed substantially at and above said primary critical speed of rotation of said pawl carrying clutch structure, releasable means acting to hold said pawl against movement into said slot under the influence of centrifugal force acting on the pawl during rotation thereof at speeds of rotation of said pawl carrying clutch structure less than a predetermined secondary critical speed of rotation of the pawl carrying clutch structure and greater than said primary critical speed, said secondary critical speed of rotation being at least as great as the rotational speed of said driven shaft when said driven shaft is driving said slot carrying clutch structure at a speed of rotation of said slot carrying clutch structure substantially equal to said primary critical speed, said releasable holding means being adapted to release said pawl for clutching action at speeds substantially at and above said secondary critical speed of rotation of said pawl carrying clutch structure, said releasable holding means being rendered substantially ineffective to restrain pawl clutching movement subsequent to release of said releasable holding means and during rotation of said pawl carrying clutch structure substantially at or above said primary critical speed, said pawl being adapted for movement under the influence of centrifugal force acting thereon into clutching engagement with said slot when the rotational speed of said pawl carrying clutch structure is reduced to substantially the rotational speed of said slot carrying clutch structure.

10. In a device for drivingly connecting driving and driven members, a pawl carrying structure adapted for driving connection to one of said members, a pawl receiving structure adapted for driving connection to the other of said members, said pawl receiving structure having a substantially cylindrical shell formed with a slot extending outwardly therefrom, a pawl carried by said pawl carrying structure and having a clutching portion thereof adapted for projection into said slot in response to rotation of said structures at substantially the same speed, yielding means urging said pawl to its retracted position in opposition to centrifugal force acting on said pawl, and latching means for holding said pawl against projection until said pawl carrying structure is rotated at a speed substantially greater than that otherwise sufficient to urge projection of said pawl, said pawl having a plurality of progressive stages of projection respectively corresponding to pawl projection in response to release of said latching means and in response to synchronized rotation of said structures.

11. In a device for drivingly connecting driving and driven members, a pawl carrying structure adapted for driving connection to one of said members, a pawl receiving structure adapted for driving connection to the other of said members, said pawl receiving structure having a substantially cylindrical shell formed with a slot extending outwardly therefrom, a pawl carried by said pawl carrying structure and having a clutching portion thereof adapted for projection into said slot in response to rotation of said structures at substantially the same speed, yielding means urging said pawl to its retracted position in opposition to centrifugal force acting on said pawl, and latching means for holding said pawl against projection until said pawl carrying structure is rotated at a speed substantially greater than that otherwise sufficient to urge projection of said pawl, said pawl having a plurality of progressive stages of projection respectively corresponding to pawl projection in response to release of said latching means and in response to synchronized rotation of said structures, said pawl having a clearance with said shell at least sufficient to accommodate said first stage of pawl projection.

12. In a device for drivingly connecting driving and driven members, a pawl carrying structure adapted for driving connection to one of said members, a pawl receiving structure adapted for driving connection to the other of said members, said pawl receiving structure having a substantially cylindrical shell formed with a slot extending outwardly therefrom, a pawl carried by said pawl carrying structure and having a clutching portion thereof adapted for projection into said slot in response to rotation of said structures at substantially the same speed, yielding means urging said pawl to its retracted position in opposition to centrifugal force acting on said pawl, and latching means for holding said pawl against projection until said pawl carrying structure is rotated at a speed substantially greater than that otherwise sufficient to urge projection of said pawl, said pawl having a plurality of progressive stages of projection respectively corresponding to pawl projection in response to release of said latching means and in response to synchronized rotation of said structures, said latching means being releasable only when the rotational speeds of said structures are sufficiently different to prevent projection of said pawl into said slot.

13. In a clutch, clutching members respectively provided with a pawl and a pawl-receiving slot, said slot being adapted to receive said pawl on rotational synchronization of said members at or above a predetermined speed to positively drivingly connect said members, yielding means opposing the centrifugal force acting on said pawl and urging said pawl to its declutched position, and latch means acting on said pawl, said latch means being released prior to said synchronization of said members.

14. In a clutch, clutching members respectively provided with a pawl and a pawl-receiving slot, said slot being adapted to receive said pawl on rotational synchronization of said members at or above a predetermined speed to positively drivingly connect said members, yielding means opposing the centrifugal force acting on said pawl and urging said pawl to its declutched position, and latch means acting on said pawl, said latch means being released prior to said synchronization of said members, said pawl having at least two stages of progressive movement respectively occurring on release of said latch means and on synchronization of said members subsequently thereto.

15. In a clutch for drivingly connecting driving and driven members, a pawl carrying structure adapted for driving connection to one of said members, a pawl receiving structure adapted for driving connection to the other of said members, a plurality of pawls carried by said pawl carrying structure and adapted for clutching movement, means carried by said pawl receiving structure for receiving said pawls to positively connect said structures in response to substantially synchronized rotation of said structures at or above a predetermined speed, yielding means urging said pawls to their disengaged positions, one of said pawls having a portion thereof slidably engaging a portion of another of said pawls, a latching member carried by one of said pawl portions, the other of said pawl portions having a plurality of means adapted for selective engagement with said latching member.

16. In a clutch for drivingly connecting driving and driven members, a pawl carrying structure adapted for driving connection to one of said members, a pawl receiving structure adapted for driving connection to the other of said members, a plurality of pawls carried by said pawl carrying structure and adapted for clutching movement, means carried by said pawl receiving structure for receiving said pawls to positively connect said structures in response to substantially synchronized rotation of said structures at or above a predetermined speed, yielding means urging said pawls to their disengaged positions, one of said pawls having a portion thereof slidably engaging a portion of another of said pawls, a spring actuated latching ball carried by one of said pawl portions, the other of said pawl portions having a plurality of spaced detents selectively engageable with said ball.

17. In a clutch for drivingly connecting driving and driven members, a pawl carrying structure adapted for driving connection to one of said members, a pawl receiving structure adapted for driving connection to the other of said members, a plurality of pawls carried by said pawl carrying structure and adapted for clutching movement, means carried by said pawl receiving structure for receiving said pawls to positively connect said structures in response to substantially synchronized rotation of said structures at or above a predetermined speed, yielding means urging said pawls to their disengaged positions, one of said pawls having a portion thereof slidably engaging a portion of another of said pawls, a spring actuated latching ball carried by one of said pawl portions, the other of said pawl portions having a plurality of spaced detents selectively engageable with said ball, the spacing of said detents being substantially equal to half of the travel of said pawl portions when the pawls move from their engaged to their disengaged positions.

18. In a clutch for drivingly connecting driving and driven members, a pawl carrying structure adapted for driving connection to one of said members, a pawl receiving structure adapted for driving connection to the other of said members, a plurality of pawls carried by said pawl carrying structure and adapted for clutching movement, means carried by said pawl receiving structure for receiving said pawls to positively connect said structures in response to substantially synchronized rotation of said structures at or above a predetermined speed, yielding means urging said pawls to their disengaged positions, one of said pawls having a portion thereof slidably engaging a portion of another of said pawls, a spring actuated latching ball carried by one of said pawl portions, the other of said pawl portions having a plurality of spaced detents selectively engageable with said ball, one of said detents being wider than another.

19. In a clutch for drivingly connecting driving and driven members, a centrifugally actuated clutching element drivingly connected to one of said members, a structure having an opening adapted for clutch engagement with said element and adapted for driving connection to the other of said members, engagement of said element and structure providing a positive driving connection between said members, means for preventing engagement of said element with said opening until the speeds of said element and opening approach substantially synchronism, means for controlling movement of said element including yielding means opposing clutching movement of said element and latch means releasably restraining clutching movement of said element, said element when released by said latch means being movable under control of said controlling means by centrifugal force only partially toward its clutching position.

20. In a centrifugally operated clutch, driving and driven rotatable clutch members, one of said members having an element actuated by centrifugal force into engagement with the other of said members, the last said member having an opening for receiving said element, means for controlling movement of said element including yielding means urging said element toward its disengaged position and releasable means restraining movement of said element from its engaged position toward its disengaged position when said yielding means tends to disengage said element, means for preventing engagement of said element with said opening until the rotational speeds of said element and opening approach substantially synchronism, said restraining means being releasable at a predetermined speed of rotation of said element, said element being movable under control of said controlling means to establish said engagement subsequent to release of said restraining means and in response to substantially synchronized rotation of said clutch members.

21. In a centrifugally operated clutch, a rotatable member formed with a pawl receiving slot, a rotatable cage provided with a pawl actuated in response to centrifugal force and having a portion thereof adapted to engage said slot, said pawl having a guide portion disposed substantially diametrically opposite its engaging portion, a spring acting on said pawl in opposition to centrifugal force movement thereof, said pawl having a clearance with said rotatable member prior to clutching of said pawl in said slot, and restraining means acting on said pawl prior to centrifugal force actuation thereof, said clearance accommodating movement of said pawl to release said restraining means, said slot being adapted to receive said pawl subsequently to the last said pawl movement and in response to approximate synchronization in the speeds of said rotatable cage and member.

22. In a centrifugally operated clutch, a rotatable member formed with a pawl receiving slot, a rotatable cage provided with a pawl actuated in response to centrifugal force and having a portion thereof adapted to engage said slot, said pawl having a guide portion disposed substantially diametrically opposite its engaging portion, a spring acting on said pawl in opposition to centrifugal force movement thereof, and means yieldingly restraining movement of said pawl for clutching and de-clutching movements thereof.

23. In a centrifugally operated clutch, a rotatable shell having a pawl-receiving slot, a rotatable cage mounted on a shaft concentric with the shell and carrying a pawl actuated by centrifugal force, said pawl having an enlarged end, a portion of which is adapted to engage said slot in response to approximately synchronized rotation of said shell and cage at or above a predetermined speed, said pawl having a reduced yoke portion extending inwardly of said cage and at least partially around said shaft to provide a spring seat relatively remotely spaced from said enlarged end portion, a spring acting on said spring seat to oppose centrifugal movement of said pawl, restraining means acting on said pawl prior to centrifugal movement thereof, said pawl having a clearance with said shell prior to centrifugal pawl movement sufficient to accommodate centrifugal pawl movement upon release of said restraining means prior to said synchronization.

24. In a centrifugally operated clutch, a rotatable shell having a pawl-receiving slot, a rotatable cage mounted on a shaft concentric with the shell and carrying a pawl actuated by centrifugal force, said pawl having an enlarged end, a portion of which is adapted to engage said slot in response to approximate synchronized rotation of said shell and cage at or above a predetermined speed, said pawl having a reduced yoke portion extending inwardly of said cage and at least partially around said shaft to provide a spring seat relatively remotely spaced from said enlarged end portion, a spring acting on said spring seat to oppose centrifugal movement of said pawl, retraining means acting on said pawl prior to centrifugal movement thereof, said pawl having a clearance with said shell prior to centrifugal pawl movement sufficient to accommodate centrifugal pawl movement upon release of said restraining means prior to said synchronization, and means yieldingly restraining movement of said pawl from its clutched to its de-clutched positions under the influence of said spring.

25. In a clutch for drivingly connecting driving and driven members, a positive clutch carrying structure adapted for driving connection to one of said members, a positive clutch receiving structure adapted for driving connection to the other of said members, a positive clutch carried by said carrying structure and adapted for movement in response to centrifugal force acting thereon for clutching engagement with said clutch receiving structure to provide a positive driving connection between said members, means for yieldingly urging said positive clutch towards a disengaged position and releasable means for acting on said positive clutch to restrain clutching movement thereof at a rotational speed of said clutch-carrying structure otherwise sufficient to cause clutching movement of said positive clutch, said restraining means being released in response to centrifugal force acting on said positive clutch whereby said positive clutch moves only partially toward its clutching position, said positive clutch being adapted for movement to its clutching position in response to change in rotational speed of said positive clutch-carrying structure.

26. In a centrifugally operated clutch, a rotatable clutching member having a positive clutch movably responsive to centrifugal force for clutching action, a rotatable clutching member adapted for clutching engagement with said positive clutch when the rotation of said members is substantially synchronized, yielding means opposing positive clutching movement at less than primary speed of rotation of said positive clutch and releasable means adapted until released to restrain positive clutching movement during rotation of said positive clutch at a speed substantially greater than said primary speed, said restraining means releasing said positive clutch at a predetermined secondary speed of rotation of said positive clutch, said positive clutch being adapted for clutch engaging movement subsequent to release of said restraining means and on rotational retardation of said positive clutch to a rotational speed thereof substantially equal to or greater than said primary speed.

27. In a centrifugally operated clutch, a rotatable clutching member having a positive clutch member movably responsive to centrifugal force for clutching action, a rotatable clutching member adapted for clutching engagement with said positive clutch member when the rotation of said members is substantially synchronized, yielding means opposing positive clutch member clutching movement at less than a primary speed of rotation of said positive clutch member and releasable means adapted until released to restrain positive clutch movement during rotation thereof at a speed substantially greater than said primary speed, said restraining means releasing said positive clutch member at a predetermined secondary speed of rotation of said positive clutch member, said positive clutch member being adapted for clutch engaging movement subsequent to release of said restraining means and on rotational retardation of said positive clutch member to a rotational speed thereof substantially equal to or greater than said primary speed, the rotational speed of said second clutching member being substantially the same as said primary speed at the time of said release of said restraining means.

EDWIN R. MAURER.